United States Patent [19]

Sweet

[11] 3,918,119
[45] Nov. 11, 1975

[54] ROTARY LAWN MOWER

[76] Inventor: Dale F. Sweet, P.O. Box 757, Chandler, Ariz. 85224

[22] Filed: Oct. 18, 1973

[21] Appl. No.: 407,601

Related U.S. Application Data

[62] Division of Ser. No. 275,468, July 27, 1972, Pat. No. 3,805,500.

[52] U.S. Cl. .............................................. 15/328
[51] Int. Cl.² ......................................... A47L 7/00
[58] Field of Search ............. 15/328, 334, 337, 338

[56] References Cited
UNITED STATES PATENTS

| | | | |
|---|---|---|---|
| 2,930,068 | 3/1960 | Evanson et al. | 15/328 X |
| 3,142,913 | 8/1964 | Jacob | 15/328 X |
| 3,373,514 | 3/1968 | Forren | 15/328 X |
| 3,676,893 | 7/1972 | Smythe | 15/328 |

Primary Examiner—Harvey C. Hornsby
Assistant Examiner—C. K. Moore
Attorney, Agent, or Firm—Don J. Flickinger

[57] ABSTRACT

Apparatus for converting a rotary lawn mower to a vacuum sweeper including a cover plate shaped and dimensioned to sealingly engage the lower edge of the mower blade skirt providing a closure for the blade housing, the cover plate having a central aperture connected by means of a duct to a suction cleaning head which is attached either to the cover plate or to the mower frame. Debris ejected from the mower blade housing is received and temporarily stored in a porous collector bag carried by the mower in the same manner as the normal grass cuttings collector bag.

1 Claim, 8 Drawing Figures

000
ROTARY LAWN MOWER

The instant application is a divisional application of Applicant's prior filed, then-pending patent application, Ser. No. 275,468, filed July 27, 1972, which subsequently issued as U.S. Pat. No. 3,805,500 on Apr. 23, 1974.

This invention relates to improvements for a rotary lawn mower.

In another respect, the invention pertains to attachments for enclosing the mower blade housing and connecting a vacuum cleaner head to the enclosed housing to convert the mower to a vacuum cleaner or sweeper.

Many times it would be desirable to have a heavy-duty vacuum cleaner or sweeper for outdoor use in collecting debris such as leaves, trash, etc., from sidewalks, lawns, driveways, parking lots, etc. Specially constructed heavy-duty sweepers or cleaners are available; however, they are fairly expensive and cannot be used for other purposes. A rotary lawn mower already includes most of the necessary mechanical elements necessary for a vacuum cleaner; the mower blade rotating within its housing functions as a fairly efficient "vacuum pump." As yet, however, means have not been provided to readily and temporarily convert a rotary mower to a vacuum cleaner.

Accordingly, the principal object of the invention is to provide an attachment for converting a rotary lawn mower to a vacuum cleaner.

Other, further and more specific objects and advantages of the invention will be apparent to those skilled in the art from the following detailed description thereof taken in conjunction with the drawings, in which.

The vacuum sweeper attachment for a rotary mower comprises a cover plate shaped and dimensioned to sealingly engage the lower edge of the peripheral skirt of the mower blade housing. The cover plate has a central aperture located generally coaxially with respect to the axis of rotation of the mower blade. A suction cleaning head is provided having an inlet aperture for collecting debris from the surface to be cleaned. Duct means communicate between the inlet aperture of the cleaning head and the central aperture in the cover plate. Debris sucked through the inlet aperture of the cleaning head is carried through the duct, through the mower blade housing, and is ejected through an aperture in the mower blade housing into a porous bag or other means for receiving and temporarily storing the debris.

Figure 1:
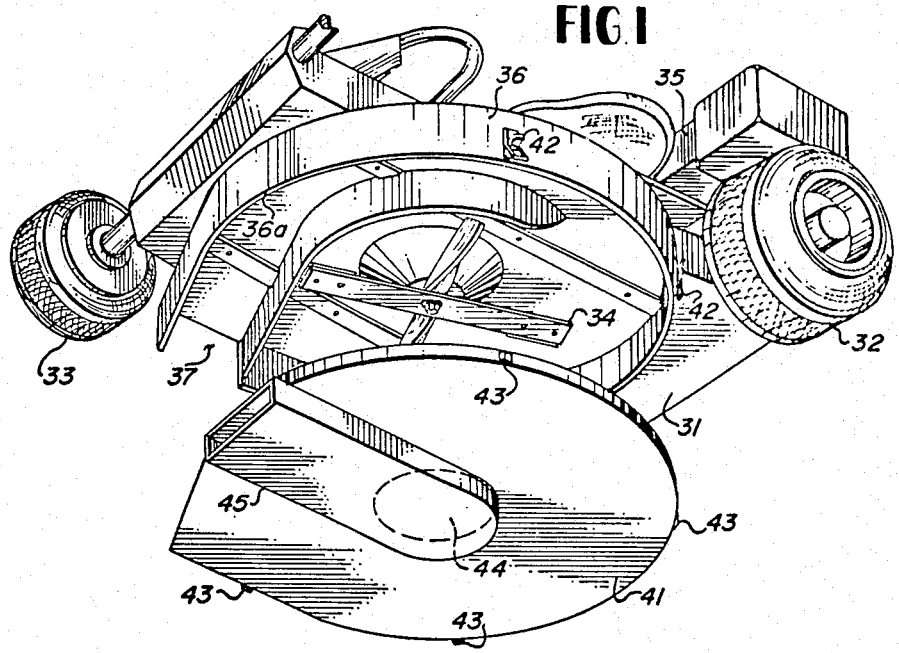
FIG. 1 is a perspective view of the bottom of a typical rotary lawn mower illustrating apparatus for converting the mower to a vacuum cleaner.

FIGS. 1–8 illustrate apparatus embodying the invention useful for converting a rotary lawn mower for use as a vacuum cleaner or sweeper. FIG. 1 is a perspective view of the bottom of a conventional rotary lawn mower which includes a frame portion 31, rear wheels 32 and front wheels 33 supporting the frame 31. A horizontal mower blade 34 is rotatably mounted on the frame 31. A suitable motor 35, either an internal combustion engine or an electric motor, provides power for rotating the blade 34 through a suitable power coupling. A mower blade housing having a downwardly depending peripheral skirt 36 encloses the space swept by the rotating blade 34. Grass cuttings are expelled from the mower blade housing through an aperture 37 communicating with a channel formed between the peripheral skirt 36 and an internal skirt 37 spaced inwardly from the peripheral skirt 36. Rotation of the mower blade 34 causes air drawn into the housing beneath the edge of the peripheral skirt 36 to be expelled tangentially through the aperture 37 with the grass clippings entrained in the moving airstream. To convert the mower for use as a vacuum sweeper, a cover plate member 41 is shaped and dimensioned to sealingly engage the lower edge 36a of the peripheral skirt 36 so as to provide a closure for the mower blade housing. The cover plate 41 is secured to the peripheral skirt 36 by any suitable means such as trunk latches 42 which engage projections 43 spaced around the periphery of the cover plate 41. The cover plate 41 has a central air inlet aperture 44 located generally coaxially with respect to the axis of rotation of the mower blade 34.

Figure 2:
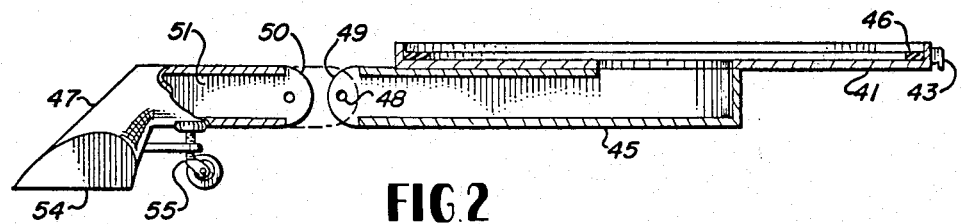
FIG. 2 is a sectional side view of the vacuum cleaner attachment of FIG. 10 showing the details of connecting the vacuum cleaner head to the mower.
Figure 3:
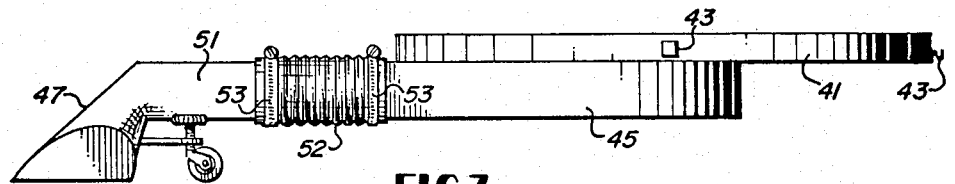
FIG. 3 is a side view of the vacuum cleaner attachment of FIG. 1 showing details of another method of connecting a vacuum cleaner head.

A duct member 45 extends forwardly and is connected to a suction cleaning head by any suitable means as illustrated, for example, in FIGS. 2–3. The cover plate 41 is preferably provided with a suitable resilient sealing ring 46 which engages the lower edge 36a of the peripheral skirt 36 to effect a seal between the skirt 36 and the plate 41. The duct 45 extends forward and is coupled to a suction cleaning head 47 through a flexible joint. As shown in FIG. 11, the flexible joint may consist of a pivotal connection between the duct 45 and the cleaning head 47 by means of a pin 48 passing through apertures in tabs 49 and 50 formed on both sides of the duct 45 and the rearward extension 51 of the cleaning head 47.

As shown in FIG. 3, the flexible connection between the cleaning head 47 and the duct 45 can be effected by means of a flex-hose 52 of rectangular cross section secured to the duct 45 and the rearward extension 51 of the cleaning head 47 by means of suitable hose clamps 53. The height of the inlet aperture 54 of the cleaning head 47 above the surface to be cleaned is regulated by the adjustment of a caster wheel 55 extending downwardly from the rearward extension 51 of the cleaning head 47.

Figure 4:
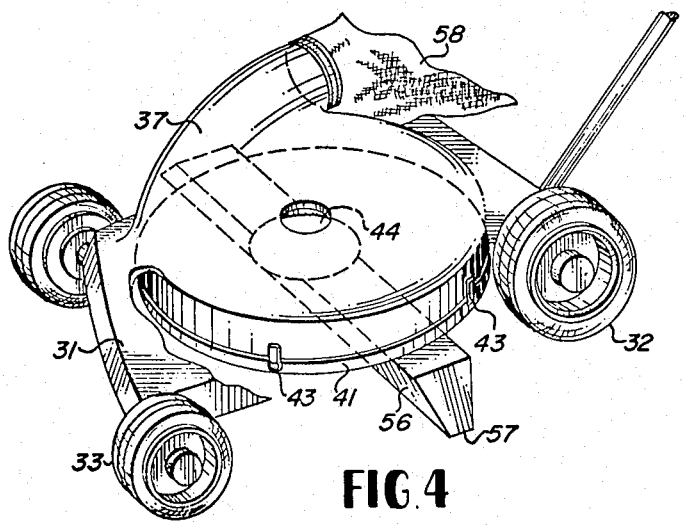
FIG. 4 is a perspective view of a walking rotary mower showing another method of conversion to a vacuum cleaner.
Figure 5:
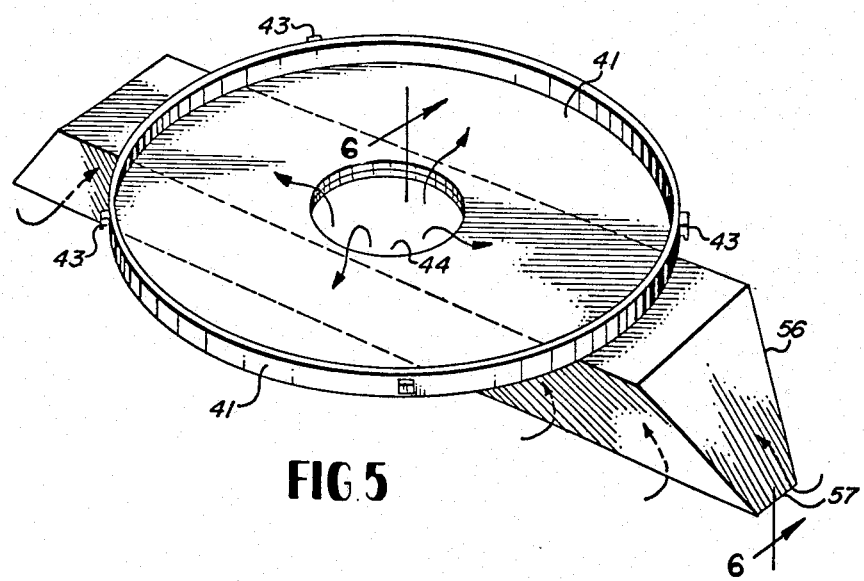
FIG. 5 is a perspective view of the vacuum cleaner attachment of FIG. 4.
Figure 6:
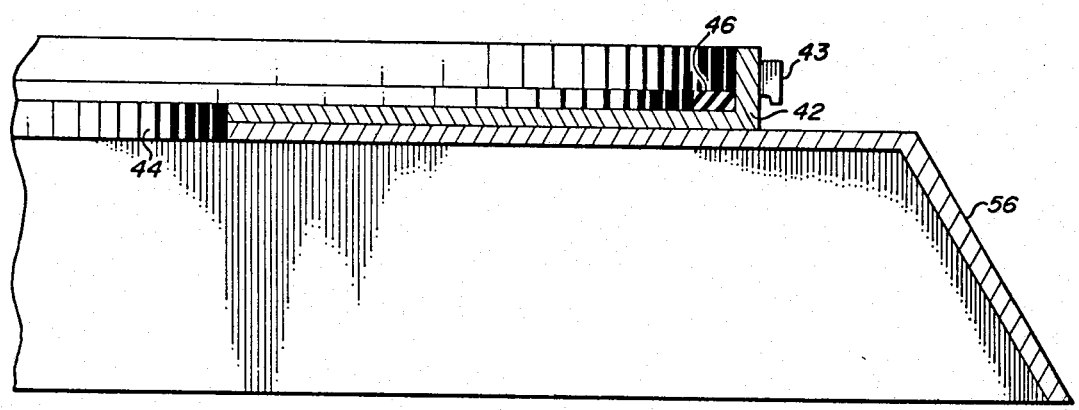
FIG. 6 is a sectional view of the apparatus of FIG. 5 taken along section line 6—6 thereof.
Figure 7:
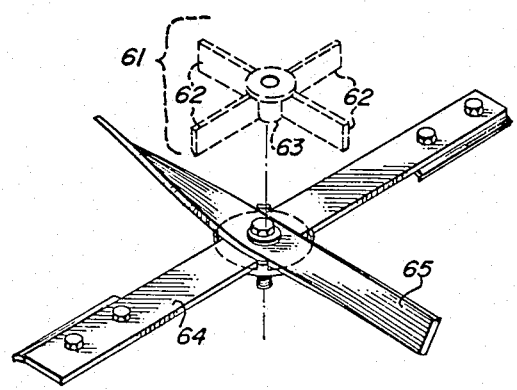
FIG. 7 illustrates modifications of a conventional rotary mower blade which improve its capacity to create a vacuum within the mower blade housing.

FIGS. 4–6 illustrate another embodiment of the invention especially adapted for use with smaller walking-type rotary lawn mowers. In FIGS. 4–6, the engine and rotating blade are omitted for purposes of clarity. As shown in FIGS. 4–6, the cover plate 41 is sealingly engaged with the downwardly depending skirt 36 of the mower blade housing, again by means of suitable trunk latches 42–43. A laterally extending duct 56 communicates between the central aperture 44 in the cover plate 41 and the open slot 57 forming a suction cleaning head.

Debris ejected from the mower blade housing 36 through the aperture 37 is received in and temporarily stored in a porous collector bag 58.

To increase the volume of air passing through the cleaning head and mower blade housing of the apparatus of FIGS. 1–6, an auxiliary fan 61 comprising laterally extending blades 62 mounted on a central hub 63 can be mounted coaxially on the shaft of the conventional mower blade 64. Alternatively, a single fan blade 65 can be mounted on the mower blade shaft at right angles to the conventional mower blade.

Figure 8:
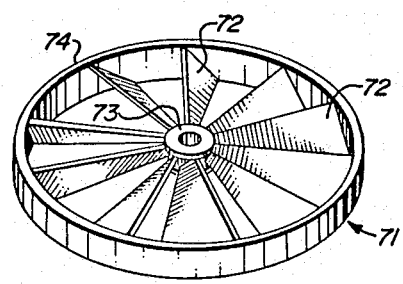
FIG. 8 is a fan blade which can be substituted for the mower blade to improve its air-moving characteristics.

The efficiency of operation of a rotary mower as a vacuum cleaner can be further enhanced by a turbine blade 71 of the type illustrated in FIG. 8 comprising a plurality of inclined vanes 72 mounted between a central hub 73 and a peripheral skirt 74. The mower blade 34 is completely removed and the turbine fan 71 is substituted, converting the rotary mower semi-permanently to a vacuum sweeper.

Having fully described my invention and the presently preferred embodiments thereof, I claim:

1. Apparatus for converting a rotary lawn mower to a vacuum sweeper, said rotary lawn mower including:
   a mower frame,
   wheel means carried by said frame for supporting said frame above the ground,
   a horizontal mower blade rotatably mounted on said frame at grass-cutting height,
   motor means carried by said frame for rotating said mower blade,
   a fixed mower blade housing carried by said frame above said mower blade and having a downwardly depending peripheral skirt enclosing the space swept by said rotating blade, and
   means defining an aperture in said skirt for expelling grass cuttings from said housing,
said apparatus comprising:
   a. a cover plate member shaped and dimensioned to sealingly engage the lower edge of said peripheral skirt, providing a closure for said mower blade housing, said cover plate having a central aperture therein located generally coaxially with respect to the axis of rotation of said mower blade;
   b. an elongate suction cleaning head forward of said lawn mower and extending laterally thereto and having a downwardly directed inlet aperture for collecting debris from the surface to be cleaned;
   c. wheel means carried by said cleaning head for supporting said inlet aperture above said surface;
   d. duct means communicating between said cleaning head and the central aperture in said cover plate;
   e. flexible connection means in said duct means for vertical movement of said cleaning head relative of said lawn mower; and
   f. means for receiving and temporarily storing debris ejected through said aperture from said mower blade housing.

* * * * *